United States Patent [19]
Strickland et al.

[11] Patent Number: 5,503,201
[45] Date of Patent: Apr. 2, 1996

[54] TREE SHEAR

[75] Inventors: Dean R. Strickland, Caney; Kenneth C. Fobian, Havana, both of Kans.

[73] Assignee: F & S Industries, Havana, Kans.

[21] Appl. No.: 364,282

[22] Filed: Dec. 27, 1994

[51] Int. Cl.$^6$ .................................. A01G 23/08
[52] U.S. Cl. ................ 144/34 E; 30/379.5; 47/1.5; 56/13.6; 56/16.8; 56/293; 83/169; 83/928; 144/34 R; 144/339; 144/364
[58] Field of Search ............... 47/1.5, 1.01; 56/10.1, 56/13.6, 15.5, 16.8, 233, 234, 293, DIG. 5; 83/169, 928; 144/2 Z, 3 D, 34 R, 34 E, 335, 336, 339, 364; 30/379, 379.5

[56] References Cited

U.S. PATENT DOCUMENTS

| | | | |
|---|---|---|---|
| 3,857,515 | 12/1974 | Zennie | 56/16.8 |
| 3,866,397 | 2/1975 | Koziol | 56/16.8 |
| 3,995,671 | 12/1976 | Wirt | 144/34 E |
| 3,996,982 | 12/1976 | Olbenburg | 144/34 E |
| 4,210,183 | 7/1980 | Nilsen | 144/34 E |
| 4,640,322 | 2/1972 | Allen | 144/34 E |
| 4,926,622 | 5/1990 | McKee | 56/16.8 |

*Primary Examiner*—W. Donald Bray
*Attorney, Agent, or Firm*—Jacobson, Price, Holman & Stern

[57] ABSTRACT

A pair of pincer-type cutting blades are pivotally supported from a frame to be mounted from a front loader and fluid cylinders having base ends pivotally supported from the frame outwardly of the remote sides of the cutting blades include outer ends universally coupled to the front ends of the cutting blades, the pivot axes of the cutting blades and the base ends of the cylinders being substantially parallel and the cylinders being downwardly and outwardly inclined toward the free ends thereof relative to a plane normal to the aforementioned axes, whereby the cutting blades, during movement toward their closed positions, are slightly downwardly and laterally displaced at their forward ends. A front loader including forwardly projecting lift arms is provided from which the aforementioned frame is supported and the front loader includes a forwardly spaced and downwardly directed spray head intermediate the lift arms thereof for downwardly directing a spray of vegetation killer upon a cut tree stump.

9 Claims, 3 Drawing Sheets

TREE SHEAR

BACKGROUND OF THE INVENTION

1. Field of the Invention

The present invention relates generally to a pincer-type hydraulically actuated shear for cutting tree trunks and more specifically to a hydraulic ram actuated shear designed (1) to provide maximum cutting power for given capacity hydraulic cylinders, (2) to provide cutting blades with opposing forwardly extended forward ends, (3) to provide a low wear connection between the hydraulic cylinders and the shear blades and (4) to downwardly and outwardly angle the hydraulic cylinders relative to the planes in which the shear blades swing to downwardly laterally load the shear blades during a cutting operation and thus substantially reduce the possibility of opposite lateral deflection of the shear blades during a cutting operation.

2. Description of Related Prior Art

Various different forms of tree shears and the like incorporating many of the general structural and operational features of the instant invention heretofore have been provided. Examples of these previously known forms of tree shears are disclosed in U.S. Pat. Nos. 3,590,894, 4,387,752, 4,679,604, 4,683,924, 4,913,203, 5,161,588 and 5,318,081. However, these previously known forms of tree shears do not include the improved structural relationships between the hydraulic cylinders and shear blades of the instant invention which result in improved operation.

SUMMARY OF THE INVENTION

The tree shear of the instant invention structurally and operationally arranges the outer ends of the pivotally mounted pincer-type shear blades and actuating hydraulic cylinders therefore in a manner such that the hydraulic cylinders exert thrust on the blades during a cutting operation in a direction disposed almost normal to the longitudinal extent of the cutting blades. Further, the hydraulic cylinders are slightly inclined, outwardly and downwardly, relative to the horizontal plane in which the pincer-type cutting blades are swingable to thereby laterally load the cutting blades against opposite lateral deflection during a cutting operation.

Still further, the outer ends of the hydraulic cylinders are connected to the outer end portions of the cutting blades through the utilization of ball and socket joints as opposed to pure pivotal connections and the entire tree shearing assembly is mounted from the lift arms of a front loader vehicle having a centrally located and slightly forwardly offset and downwardly directed spray head supported therefrom, whereby immediately subsequent to a tree trunk shearing operation (at substantially ground level) the front loader vehicle may be moved slightly forwardly and momentarily stopped in order to direct a downward spray of vegetation killer on the freshly cut ground stump.

The main object of this invention is to provide a tree shear head capable of support from the lift arms of various different forms of front loader vehicles and which also may be utilized effectively to create a clean, substantially level cut through a tree trunk at substantially ground level.

Another object of this invention in accordance with the immediately preceding object, is to provide a tree cutter of the pincer-type and wherein the swingable blades are actuated by hydraulic cylinders slightly inclined relative to the plane in which the blades swing so as to increasing laterally load the blades during a tree trunk cutting operation and thereby substantially reduce the possibility of opposite lateral deflection of the blades during a tree cutting operation, which opposite lateral deflection causes a rough and incomplete cut.

Another very important object of this invention is to provide ball and socket connections between the tree shearing blades and the actuating cylinders therefor, whereby opposing bearing surfaces are established which are considerably more resistant to wear.

Yet another object of this invention is to provide ball and socket connections between the cutting blades and the associated hydraulic cylinders of a type wherein the effective length of the hydraulic cylinders may be adjusted by a threaded connection between the ball portions of the ball and socket connections and the extendable piston shaft portions of the hydraulic cylinders.

An ancillary object of this invention is to also provide a hydraulic cylinder actuated tree shear wherein the directions of thrust generated by the hydraulic cylinders during final cutting movements of the shear blades are disposed substantially normal to the longitudinal extent of the shear blades.

A still further object of this invention is to provide a tree shearing apparatus which may be readily removably supported from the lift arms of a front loader vehicle and wherein the central forward portion of the front loader vehicle includes a downwardly directed spray head for downwardly spraying vegetation upon the ground immediately forward of the front loader vehicle, thus enabling the operator of the vehicle, subsequent to performing a tree trunk shearing operation, to move slightly forwardly, momentarily stopped and then spray the freshly cut ground level tree stump with vegetation killer.

A final object of this invention to be specifically enumerated herein is to provide a tree shear in accordance with the preceding objects and which will conform to conventional forms of manufacture, be of simple construction and easy to use so as to provide a device that will be economically feasible, long lasting and relatively trouble free in operation.

These together with other objects and advantageous which will become subsequent apparent reside in the details of construction and operation as more fully hereinafter described and claimed, reference being had to the accompanying drawings forming a part hereof, wherein like numerals refer to like parts throughout.

DESCRIPTION OF THE PRECEDED EMBODIMENT

Figure 1:
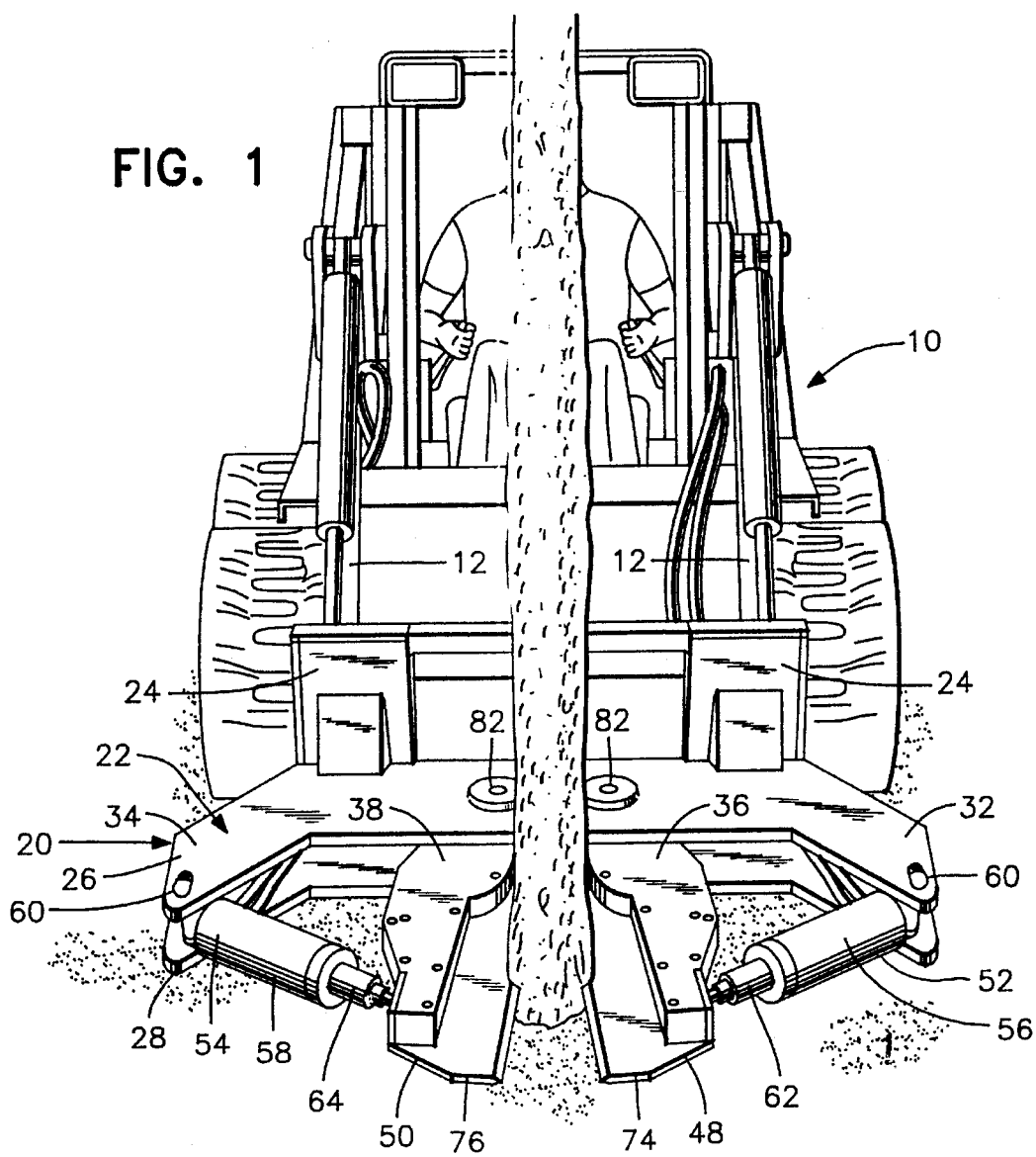
FIG. 1 is a front elevational view of the tree shear shown supported from a conventional form of front loader vehicle and in the process of shearing a tree trunk at substantially ground level.
Figure 2:
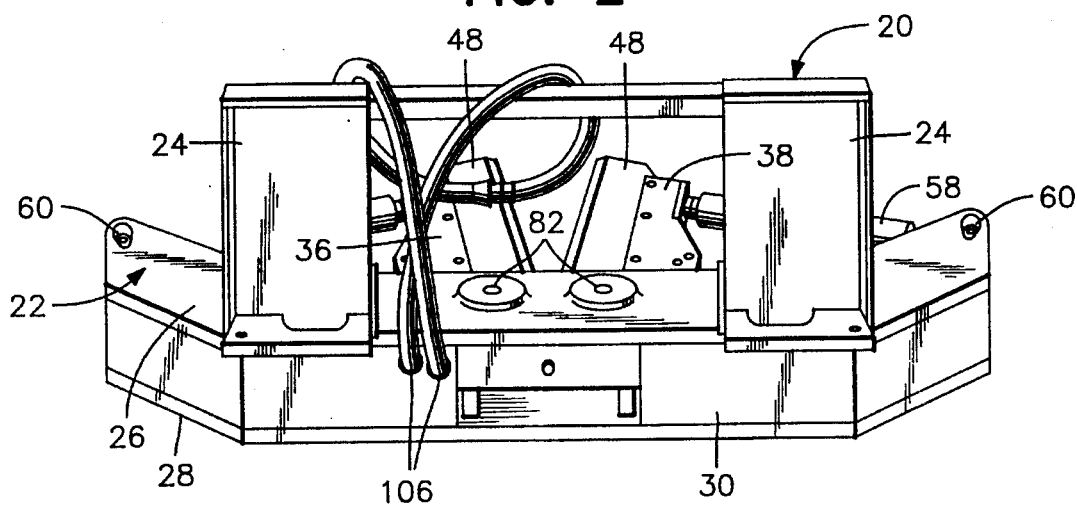
FIG. 2 is a rear elevational view of the tree shear as dismounted from the associated front loader vehicle.

Referring now more specifically to the drawings the numeral 10 generally designates a conventional form of front loader vehicle including opposite side forwardly projecting front lift arms 12 and a support frame 14 pivotally supported from the support arms 12 as at 16 and having tilt cylinders 18 pivotally connected between the support arms 12 for angularly displacing the support frame 14 relative to the support arms 12.

A tree shear referred to in general by the reference numeral 20 includes a frame 22 incorporating upright portions 24 removably mounted from the support frame 14 forward of vehicle 10 and oscillatable therewith relative to the support arms 12. The frame 22 includes vertically spaced apart upper and lower plates 26 and 28 interconnected at their rear marginal edges by a vertical interconnecting plate 30. The frame 22 defines opposite side forwardly projecting extensions 32 and 34 and while the rear side of the frame 22 is closed by the plate 30, the front side of the frame 22 is open.

A pair of support arms 36 and 38 have rear ends 40 and 42 pivotally mounted between the plates 26 and 28 and the front ends 44 and 46 of the support arms 36 and 38 project considerably forward of the front side of the frame 22 and also forward of the extensions 32 and 34, the support arms 36 and 38 being constructed of three inch steel plate. Further, ¾ inch steel blades 48 and 50 are removably secured to the undersides of the support arms 36 and 38 forward of the front side of the frame 22 and the blades 48 and 50 comprise sharpened pincer-type blades which swing in the same horizontal plane.

Figure 5:
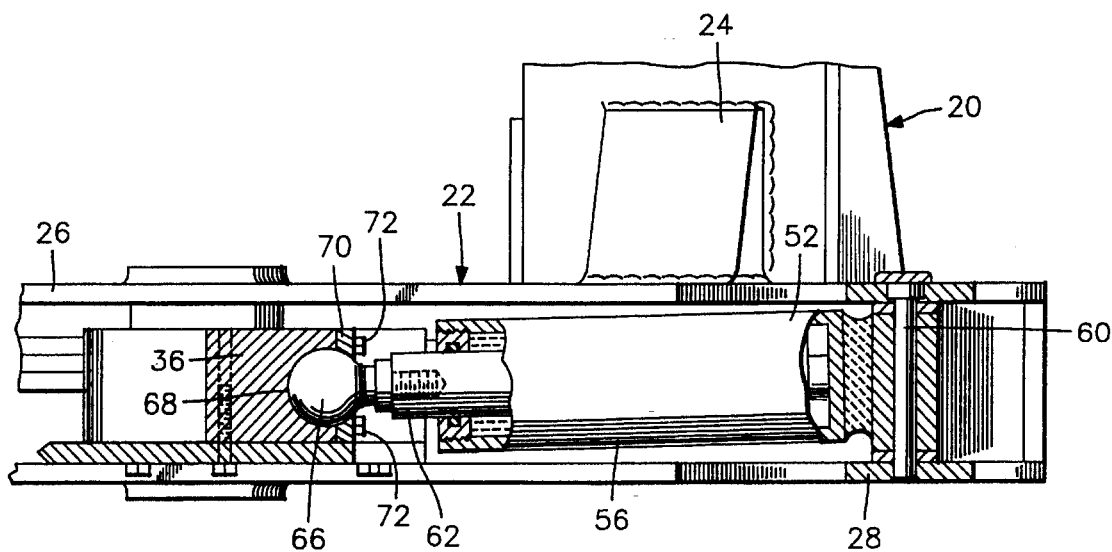
FIG. 5 is an enlarged fragmentary vertical sectional view taken substantially upon the plane indicated by the section line 5—5 of FIG. 3.
Figure 6:
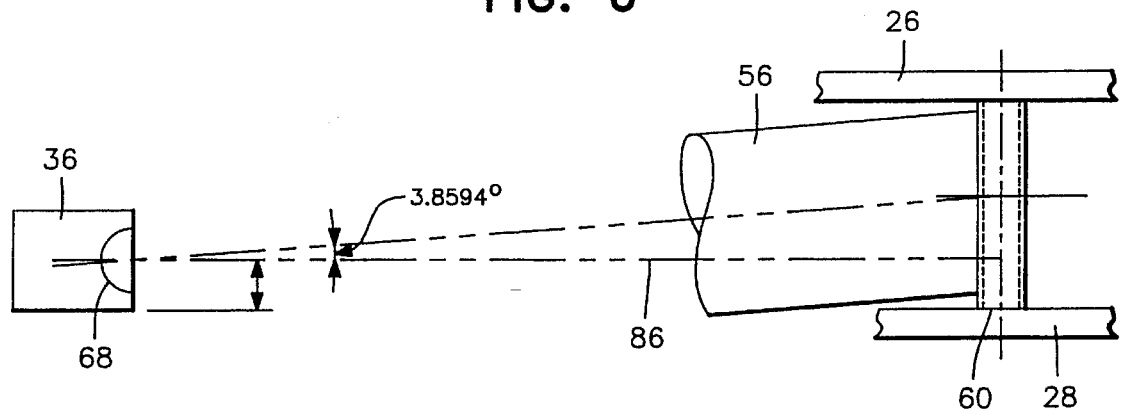
FIG. 6 comprises a schematic view illustrating the manner in which the longitudinal center lines of the hydraulic cylinders are outwardly and downwardly inclined relative to the planes in which the corresponding cutter blades swing.

The base ends 52 and 54 of a pair of hydraulic cylinders 56 and 58 are pivotally mounted, from the extensions 32 and 34, between the upper and lower plates 26 and 28 as at 60, see FIGS. 5 and 6 and the outer piston ends 62 and 64 of the cylinders 56 and 58 include ball members 66 threadedly supported therefrom and locked in adjusted positions by set screws (not shown). The remote sides of the front ends of the support arms 36 and 38 define outwardly opening partial spherical sockets 68 in which the ball members 66 are received and apertured retaining plates 70 are removably secured to the remote sides of the support arms 36 and 38 by fasteners 72 in order to retain the ball members 66 seated within the sockets 68.

The blades 48 and 50 include outer ends 74 and 76 which project forwardly of the front ends 44 and 46 by an appreciable amount. Further, the blades 48 and 50 include sharpened edges 78 and 80 which substantially contact each other the full length therealong when the arms 36 and 38 are swung to the closed positions thereof with the sharpened edges 78 and 80 abutting each other.

It will be noted that the upright plane containing the axis 82 of angular displacement of the support arms 36 and 38 is disposed considerably rearward of the upright plane containing the axis 60 of oscillation of the hydraulic cylinders 56 and it will be noted that the edges 78 and 80 are disposed fully forwardly of the front of the frame 22. Also, it will be noted that planes normal to the cutting edges 78 and 80 and passing through the centers of the ball members 66 intersect the edges 78 and 80 more than ⅔ the length thereof from the rear ends of the edges 78 and 80. Accordingly, a majority of the cutting force exerted by the hydraulic cylinders 56 and 58 is concentrated on less than the outer third of the edges 78 and 80. Further, by having the edges 78 and 80 project considerably forward of the forward ends 44 and 46, a tree trunk of large diameter first may be notched on the sides thereof opposing the arms 36 and 38 by making vertically spaced cuts in the tree trunk with those portions of the cutting edges 78 and 80 projecting forwardly of the support arms 36 and 38.

With attention now invited more specifically to FIGS. 5 and 6, it will be noted that the cylinders 56 and 58 are inclined outwardly and downwardly 3.8594° relative to the plane 86 in which the support arms 36 and 38 are swingable. Obviously, movement of the support arms 36 and 38 from the neutral open positions thereof illustrated in FIG. 3 to the closed positions thereof will result in downward lateral loading of the support arms 36 and 38. However, this downward lateral loading is not extreme. Further, as hereinbefore set forth, the outer piston ends 62 and 64 of the cylinders 56 and 58 are anchored to the front ends 44 and 46 of the support arms 36 and 38 at least ⅔ of the length of the cutting edges 78 and 80 from the rear ends thereof. This manner of connecting the hydraulic cylinders 56 and 58 to the support arms 36 and 38 enables an extremely clean cut of a tree trunk at substantially ground level. The lateral downward loading of the outer ends of the support arms 36 and 38 ensures that the support arms 36 and 38 will not be oppositely upwardly and downwardly laterally deflected during a cutting operation wherein one of the blades 48 and 50 encounters a hard or inclined grain portion of the tree trunk being cut. Thus, a "staggered" and incomplete cut is avoided.

The vehicle 10 is equipped with a forwardly offset and downwardly directed spray head 88 to which vegetation killer is supplied under pressure from a reservoir (not shown) therefore carried on the vehicle 10, a conventional diesel engine fuel pump (not shown) being utilized to supply the liquid vegetation killer to the nozzle 88 under suitable pressure. The spray head 88 is disposed between support arms 12, forward of vehicle 10 and rearward of support frame 14, as will be noted from FIGS. 3 and 4. Further, the areas above and below the spray head 88 are visually unobstructed from above, whereby a forwardly disposed operator of vehicle 10 may gaze downwardly and ascertain when the vehicle 10 is properly positioned to enable the spray head 88 to downwardly discharge a vegetation killer spray directly upon a substantially ground level tree stump.

The edges 78 and 80 are offset laterally outwardly of the opposing sides of the support arms 36 and 38 an extent equal to approximately ½ the maximum diameter of a hard wood tree trunk which may be cut by the tree shear 20 in a single cutting operation. In this manner, as the tree trunk is cut it is clamped between the opposing sides of the support arms 36 and 38 and may be held in an upright position and carried to a point of disposal while in an upright position. Further, as hereinbefore set forth, larger diameter tree trunks may be notched by the front ends of the blades 78 and 80 in order to provide clearance for the support arms 36 and 38.

Figure 3:
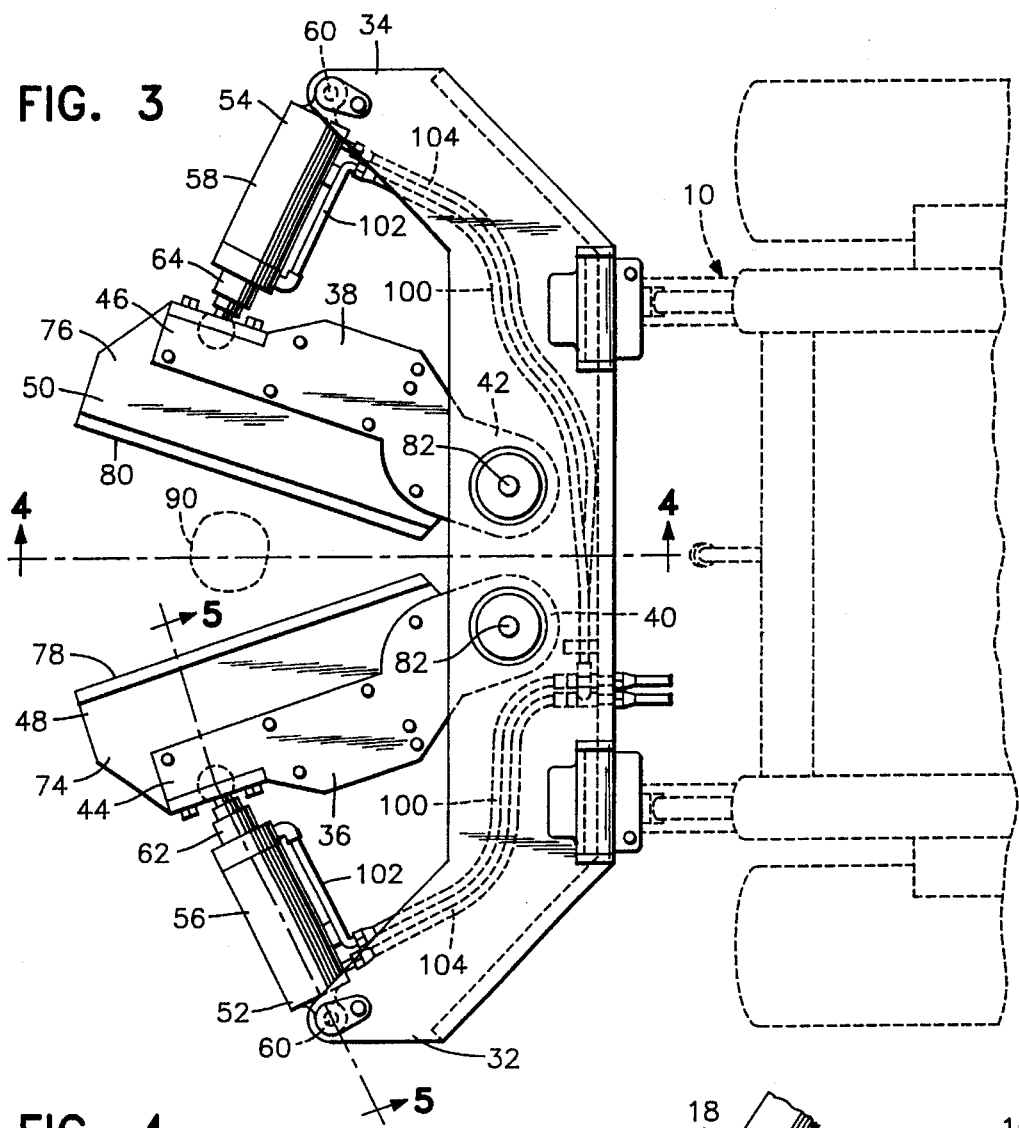
FIG. 3 is an enlarged top plan view of the tree shear illustrated in FIG. 1 with the blades thereof in a slightly more open position.
Figure 4:
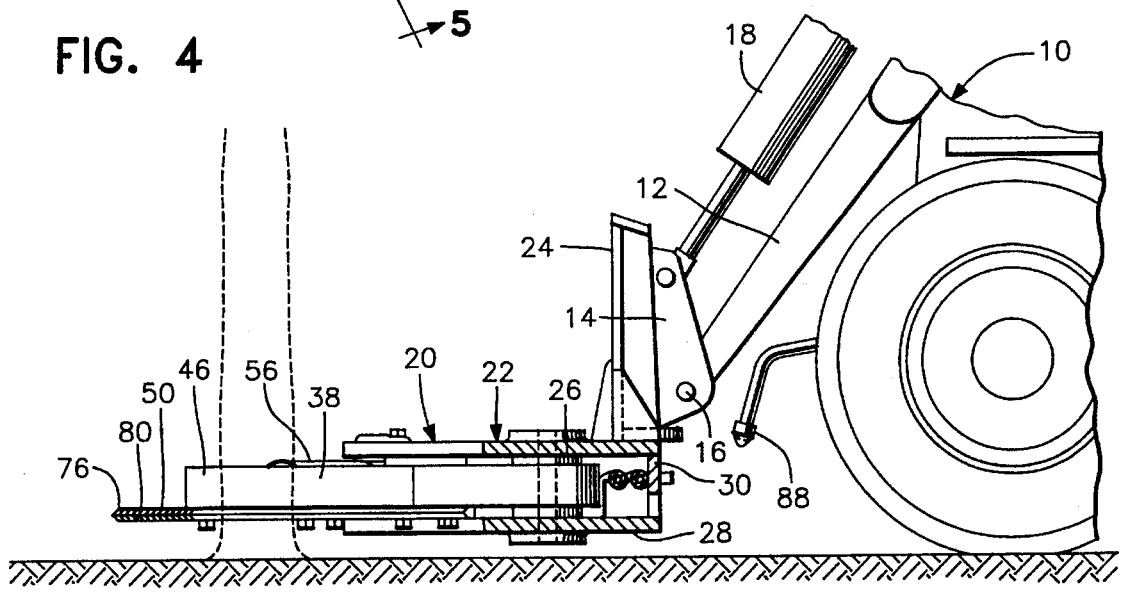
FIG. 4 is a fragmentary vertical sectional view taken substantially upon the plane indicated by the section line 4—4 of FIG. 3.

With attention invited more specifically to FIG. 3, once a tree trunk 90 has been cut, the operator of the vehicle 10 may move forwardly a short distance to register the spray discharge nozzle 88 immediately over the remaining ground stump and the aforementioned diesel engine fuel pump may be momentarily energized to cause a high pressure jet of vegetation killer to be discharged downwardly from the nozzle 88 onto the remaining ground stump. This action takes only approximately 5 seconds and the operator may thereafter transport the cut tree trunk to the desired disposal location.

The extreme over construction of the blades 48 and 50 and the support arms 36 and 38 enable the frame 22 to be used as a scoop or loader in collecting and transporting small limbs as well as horizontally disposed tree trunks to predetermined locations. Also, if the cut tree trunks are to be transported to a remote location, the frame 22 may serve as a loader for loading the cut tree trunks onto a suitable transport.

Further, it will be noted that the hydraulic hoses 100 utilized to supply hydraulic fluid under pressure in order to retract the piston ends 62 and 64 are communicated with the interiors of the hydraulic cylinders 56 and 58 through the utilization of rigid pipes rigidly supported from the rear sides of the cylinders 56 and 58. Further, the hoses 100 as well as the hoses 104 supplying hydraulic fluid to the base ends 52 and 54 of the hydraulic cylinders 56 and 58 are substantially totally enclosed within the confines of the frame 22 and open outwardly thereof only through the rear side of the frame 22 as at 106. Thus, the hoses 100 and 104 are fully protected.

The foregoing is considered as illustrative only of the principles of the invention. Further, since numerous modifications and changes readily will occur to those skilled in the art, it is not desired to limit the invention to the exact construction and operation shown and described, and accordingly, all suitable modifications and equivalents may be resorted to, falling within the scope of the invention.

What is claimed as new is as follows:

1. A tree shear including a frame having front and rear sides, a pair of elongated, laterally spaced and reinforced support arms having front and rear ends and mounted at said rear ends from said frame for pivotal movement relative to said frame about first axes in pincer-like fashion and with said front ends projecting forwardly of said frame, said frame including opposite side forwardly projecting extensions, a pair of fluid cylinders having base ends pivoted from said extension about second axes generally paralleling said first axes and outer ends pivotally connected to said front ends, a pair of opposing, pincer-type cutting blades mounted on said support arms, extending longitudinally therealong and including cutting edges offset laterally outwardly of the adjacent sides of said support arms and front and rear ends corresponding to the front and rear ends of said support arms, said first axes being disposed in a plane spaced rearward of a plane containing said second axes, the pivotal connections of said outer ends to said front ends being disposed in planes normal to said blades and spaced no more than ⅓ the distance from the front ends of said edges toward the rear ends thereof.

2. The tree shear of claim 1 wherein said blade front ends project forward of the front ends of said support arms.

3. The tree shear of claim 1 wherein said support arms and cutting blades are usually generally horizontally disposed during a tree shearing operation with said first axis and second axis substantially vertically disposed, said fluid cylinders being slightly outwardly and downwardly inclined toward the outer ends thereof, said outer ends of said fluid cylinders being connected to the front ends of said support arms by a ball and socket connecting structure.

4. The tree shear of claim 3 wherein said blade front ends project appreciably forward of the front ends of said support arms.

5. A tree shear including a frame, a pair of elongated, laterally spaced, and reinforced support arms having front and rear ends and mounted at said rear ends from said frame for pivotal movement relative to said frame about first axes in a generally horizontal cutting plane and in pincer-like fashion with said front ends projecting forwardly of said frame, a pair of fluid cylinders having base ends pivoted from said frame outwardly of the remote sides of said support arms and outer ends pivotally connected to said front ends, a pair of opposing blades mounted on said support arms, extending longitudinally therealong and including outer edges offset laterally outwardly of the adjacent sides of said support arms and including front and rear ends corresponding to the front and rear ends of said support arms, said support arms and cutting blades usually being horizontally disposed during a tree shearing operation with said first and second axes substantially vertically disposed, said fluid cylinders being slightly downwardly and outwardly inclined toward said outer ends relative to said cutting plane, said outer ends of said fluid cylinders being connected to the front ends of said support arms by ball and socket connecting structure.

6. The tree shear of claim 5 wherein said blade front ends project appreciably forward of the front ends of said support arms.

7. The tree shear of claim 5 including a front loader vehicle including forwardly projecting and vertically swingable lift arms, said frame being pivotally mounted from the forward ends of said lift arms, said vehicle including a forwardly offset and downwardly directed spray head intermediate said lift arms.

8. In combination with a loader-type vehicle including a pair of laterally spaced and forwardly projecting, vertically swingable lift arms and a support frame mounted from said lift arms for angular displacement about a horizontal transverse axis, a tree shear including a mount frame mounted from said support frame and having front and rear sides, a pair of elongated, laterally spaced and reinforced support arms having front and rear ends and mounted at said rear ends from said mount frame for pivotal movement relative to said frame in pincer-like fashion, power means for swinging said support arms toward and away from each other, a pair of opposing cutting blades mounted on said support arms and extending along and offset laterally outwardly of the adjacent sides of said support arms, and a downwardly directed spray head mounted from and disposed forward of said vehicle and rearward of said support frame between said lift arms for downwardly directing a vegetation killer spray toward a surface upon which said loader type vehicle is disposed, the area above and below said spray head being visually unobstructed from above, whereby a forwardly disposed operator of said vehicle may gaze downwardly and ascertain when said vehicle is properly positioned to enable said spray head to downwardly discharge a vegetation killer spray directly upon a substantially ground level tree stump.

9. The combination of claim 8 wherein said power means includes a pair of fluid cylinders including base ends pivotally supported from said frame outwardly of the remote sides of said support arms and outer ends universally coupled to the outer ends of said support arms, the pivot axes of said support arms and cylinders relative to said frame being substantially parallel, the outer ends of said cylinders being downwardly and outwardly inclined relative to a plane normal to the pivot axes of said support arms and fluid cylinder base ends.

* * * * *